(12) United States Patent
Arunachalam et al.

(10) Patent No.: US 11,838,408 B2
(45) Date of Patent: Dec. 5, 2023

(54) MANAGING MIGRATION OF SELF ENCRYPTED DRIVE WITHIN A SINGLE KEY MANAGEMENT SYSTEM USER GROUP

(71) Applicant: Dell Products L.P., Round Rock, TX (US)

(72) Inventors: Karthik Arunachalam, Round Rock, TX (US); Vigneswaran Ponnusamy, Round Rock, TX (US); Karthikeyan Rajagopalan, Austin, TX (US); Sanjeev Dambal, Austin, TX (US); Kumaran Palaniappan Thangavelu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 17/243,253

(22) Filed: Apr. 28, 2021

(65) Prior Publication Data
US 2022/0353057 A1    Nov. 3, 2022

(51) Int. Cl.
*H04L 9/08* (2006.01)
*H04L 9/14* (2006.01)

(52) U.S. Cl.
CPC ............ *H04L 9/083* (2013.01); *H04L 9/0866* (2013.01); *H04L 9/0894* (2013.01); *H04L 9/14* (2013.01)

(58) Field of Classification Search
CPC ......... H04L 9/08; H04L 9/083; H04L 9/0866; H04L 9/0894; H04L 9/14; H04L 9/0891; G06F 21/602; G06F 21/80; G06F 21/60
See application file for complete search history.

(56) References Cited

U.S. PATENT DOCUMENTS

| | | | |
|---|---|---|---|
| 8,719,923 B1 * | 5/2014 | Miller | G06F 21/34 |
| | | | 713/172 |
| 9,768,952 B1 * | 9/2017 | Allo | G06F 21/80 |
| 2017/0243021 A1 * | 8/2017 | Gupta | G06F 21/6218 |
| 2019/0386957 A1 * | 12/2019 | Leon | H04L 63/18 |
| 2022/0278963 A1 * | 9/2022 | Venkataraman | H04L 63/00 |
| 2022/0400007 A1 * | 12/2022 | Yoshida | H04L 9/0894 |

* cited by examiner

*Primary Examiner* — Shaqueal D Wade-Wright
(74) *Attorney, Agent, or Firm* — Jackson Walker L.L.P

(57) ABSTRACT

A disclosed method for managing encryption keys, which may be performed by a key management server, responds to receiving, from a first client, a request to create a new key for a self-encrypting drive (SED) associated with the first client by retrieving unique identifiers of the first client and the SED, generating and storing the new key and a corresponding key identifier (KeyID), and associating the unique identifiers of the SED and first client with the new key. Upon receiving, from a second client, a locate key request that includes the SED identifier, providing the new key, the KeyID, and the first client identifier to the second client. Associating the SED and first client identifiers with the new key may include adding the identifiers as attributes of the KeyID. Embodiments may be implemented in accordance with a key management interoperability protocol (KMIP) standard.

12 Claims, 2 Drawing Sheets

MANAGING MIGRATION OF SELF ENCRYPTED DRIVE WITHIN A SINGLE KEY MANAGEMENT SYSTEM USER GROUP

TECHNICAL FIELD

The present disclosure relates to information handling system security using encryption and, more specifically, management of keys used for such encryption.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server systems and other types of information handling systems provide or support enhanced security by locking managed devices within the server system with device locking keys. Network-based key management systems provide for the centralized management of device locking keys used to lock managed devices in the server systems. However, the use of such network-based key management systems can raise issues. For example, when a managed device does not store some or all information regarding an encryption key used by or within the managed device and the managed device is migrated to a new host, the new host may be unable to unlock the migrated device.

SUMMARY

In accordance with subject matter disclosed in the following description, a disclosed method for managing encryption keys, which may be performed by a key management server, responds to receiving, from a first client, a request to create a new key for a self-encrypting drive (SED) associated with the first client by retrieving unique identifiers of the first client and the SED, generating and storing the new key and a corresponding key identifier (KeyID), and associating the unique identifiers of the SED and first client with the new key. Upon receiving, from a second client, a locate key request that includes the SED identifier, providing the new key, the KeyID, and the first client identifier to the second client. Associating the SED and first client identifiers with the new key may include adding the identifiers as attributes of the KeyID. Embodiments may be implemented in accordance with a key management interoperability protocol (KMIP) standard.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
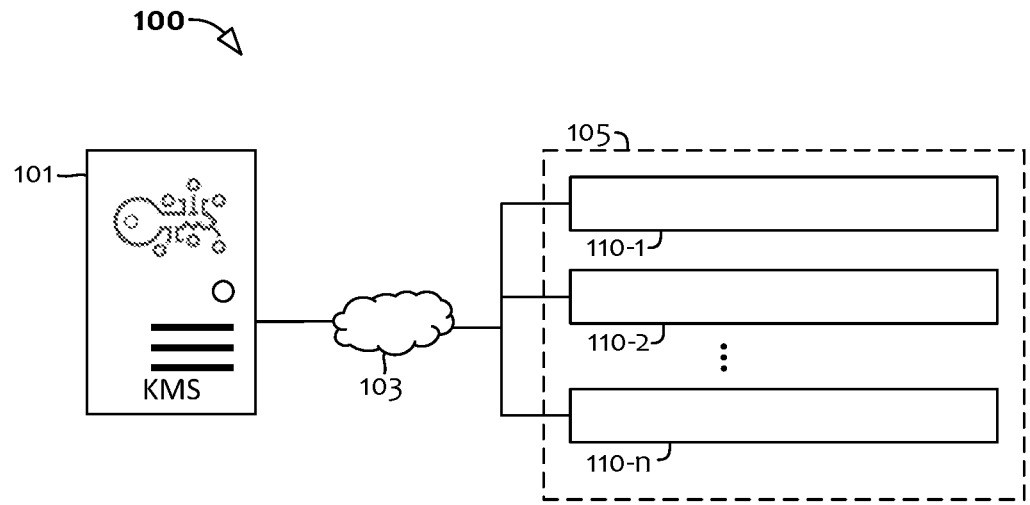
FIG. 1 illustrates a key management platform including a key management server and one or more managed systems.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a block diagram of a key management platform 100 in accordance with teachings herein. The key management platform 100 illustrated in FIG. 1 includes a key management server 101 coupled to a plurality of managed systems 110-1, 110-2, through 110-n within a key management user group 105. Each managed system 110 corresponds to an information handling system. In at least one embodiment, each of the managed systems 110 is a server, such as a rack mount server suitable for use within a data center or another analogous application or environment.

Key management server 101 is configured to facilitate and support for encryption features and services by simplifying the management of encryption keys. Key management server 101 may be configured to communicate with managed systems 110 through standardized message formats and key management operations. In at least one embodiment, key management server 101 supports and complies with a key management interoperability protocol (KMIP). KMIP is a protocol defining formats for messages to manipulate cryptographic keys on key management server 101. In the vocabulary of KMIP, KMS server 101 stores and controls managed objects, which include symmetric and asymmetric encryption keys, certificates, and other objects.

Figure 2:
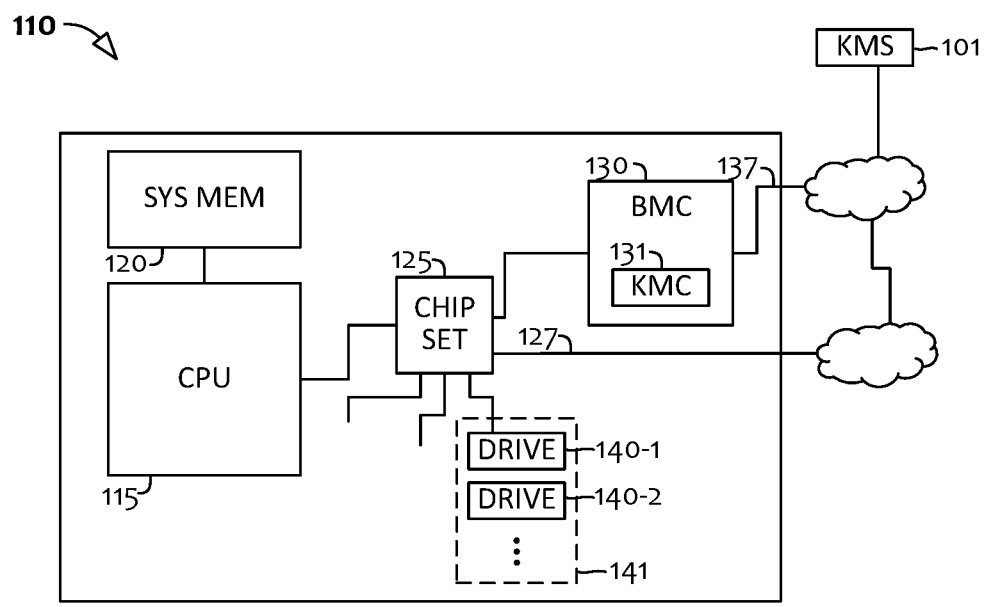
FIG. 2 illustrates an exemplary managed system.

Turning now to FIG. 2, exemplary managed system 110 is illustrated. The illustrated example of managed system 110 is a managed server system. In at least one embodiment, the managed server system is a rack server housed in a server rack within a power dense environment such as a data center.

The managed system 110 illustrated in FIG. 2 includes a central processing unit (CPU) 115 coupled to a system memory 120 and a chipset 125. Chipset 125 provides interfaces for interconnects, transports, buses, and so forth for various peripheral devices as will be familiar to those of ordinary skill in the field of microprocessor-based computer systems. The chipset 125 illustrated in FIG. 2 is communicatively coupled to a baseboard management controller (BMC) 130, a network interface referred to herein as in-band network interface 127, and a group 141 of managed devices 140. The managed devices 140 illustrated in FIG. 2 are storage devices, but it will be appreciated by those of ordinary skill that key management operations and methods described herein are readily applicable to other types of devices. The BMC 130 illustrated in FIG. 2 includes a key management client 131, described in greater detail with respect to FIG. 3 and FIG. 4, and a network interface, referred to herein as out-of-band network interface 137, which may be used by BMC resources, including key management client 131 to communicate with one or more management servers, including KMS server 101.

Figure 3:
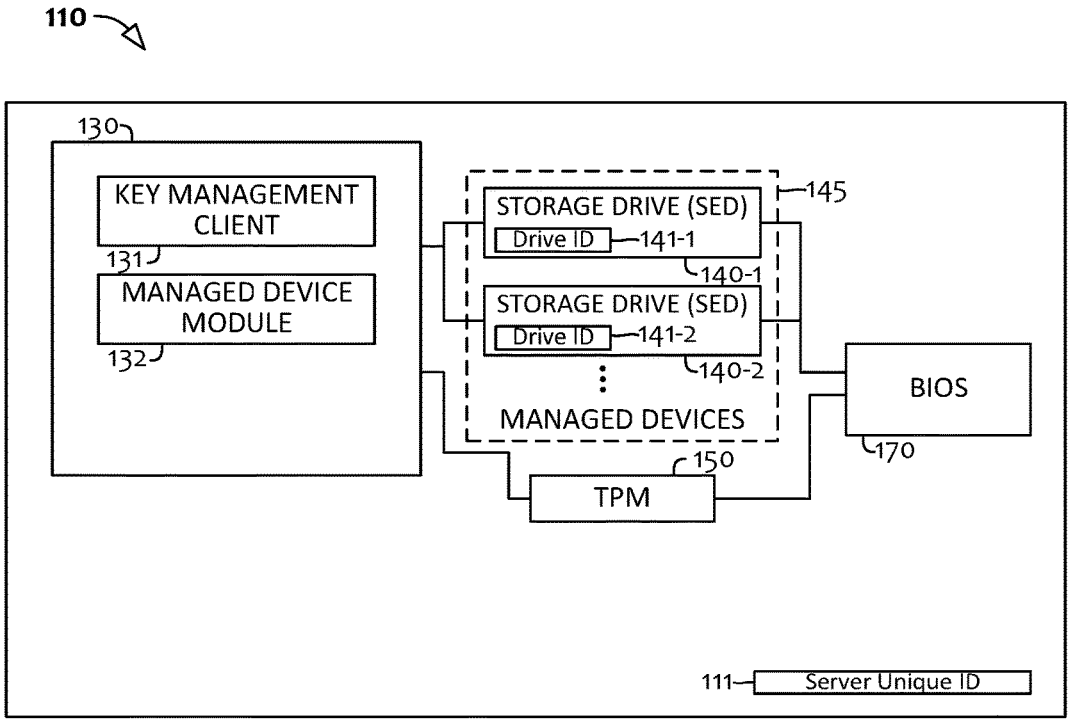
FIG. 3 illustrates additional detail of the managed system of FIG. 2.

Referring now to FIG. 3, managed system 110 may include components and/or subsystems, referred to herein as managed devices, that employ or utilize some form of encryption key managed by key management server 101. For the sake of clarity, the managed devices illustrated in FIG. 3 are limited to a plurality of storage drives, two of which are shown as storage drives 140-1 and 140-2. In at least one embodiment, storage drives 141-1 and 141-2 are self-encrypting drives whose encryption keys are managed by KMS server 101. Because the key management features are managed by a single KMS server, KMS server 101, SEDs 140-1 and 140-2 are said to belong to a single KMS user group.

In addition to SEDs 140, the managed system 110 illustrated in FIG. 3 includes an encryption key module referred to as Trusted Platform Module (TPM) 150. TPM 150 may comply with international TPM standards for secure cryptoprocessors, and may include a dedicated microcontroller to secure hardware via integrated cryptographic keys. The inclusion of TPM 150 in FIG. 3 is not intended to suggest the a TPM or an analogous component, device, or service is mandatory.

The BMC 130 illustrated in FIG. 3 includes the key management client 131, which may be implemented as a KMIP client configured to communicate with key management server 101 via the out-of-band network 137 illustrated in FIG. 2. The illustrated BMC 130 further includes a managed device module 132 to monitor status and/or performance of managed devices including SEDs 140-1 and 140-2. In addition, managed system 110 includes a server-unique ID 111, uniquely indicative of managed system 110, and a drive identifier (Drive ID) 141 for each SED 140.

Figure 4:
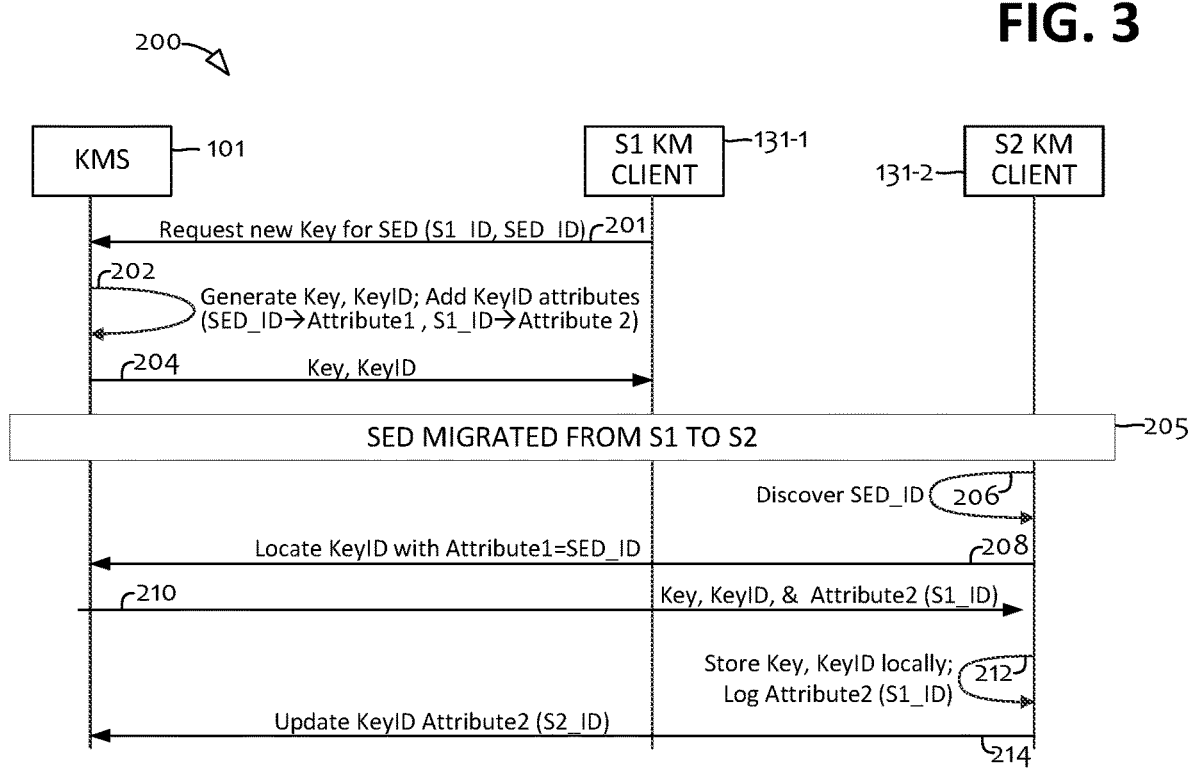
FIG. 4 is a sequence diagram illustrating a key management method for a managed device that migrates from one host to another.

Turning now to FIG. 4, a sequence diagram illustrates a method 200 for managing the migration of an SED, such as the SED 140-1 illustrated in FIG. 3, from a first managed system 110-1 (see FIG. 1) to a second managed system 110-2 (see FIG. 1). Both managed systems may be configured like or similar to the configuration illustrated in FIG. 2 and FIG. 3 as described above. In FIG. 4, first managed system 110-1 is represented by a key management client 131-1, which resides in a BMC of the first managed system 110-1 while the second managed system 110-2 is represented in FIG. 4 by second key management client 131-2, which resides in a BMC of second managed system 110-2.

The illustrated method 200 begins with first key management client 131-1 requesting (operation 201) KMS server 101 to issue a new key for an SED installed in or otherwise coupled to the first managed system. First key management client 131-1 includes the drive-unique ID SED1 (141-1) as a first parameter of the request and the server unique ID S1_ID 111 as a second parameter of the request.

In operation 202, KMS 101 generates a key, a key ID, and adds SED ID and S1_ID as attribute1 and attribute2 respectively of the KeyID. In operation 204, KMS 101 returns the newly created key and the corresponding key ID to first key management client 131-1. At some point after operation 204, the SED is migrated from the first managed device 110-1 to the second managed device 110-2. Following the migration of the SED, key management client 131-2 accesses or discovers (operation 206) the unique identifier of the self encrypting drive. The second key management client 131-2 then sends a request to KMS 101 to locate (operation 208) the keyID in which attribute1=S1_ID. MS 101 responds by returning (operation 210) the newly generated key, the corresponding key ID, and the identifier for the first managed system to key management client 131-1. Key management client 131-2 then locally stores (operation 212) the key and key ID received from Kate MS 101. Key management client 131-2 may also log the identifier for the prior server 131-1. This may be done to facilitate tracking of system resources. key management client 131-2 May also update (operation 214) the attribute to all the applicable key ID on KMS 101. Any time after the SED is unlocked, a re-key may be performed if required using a flow 200 as illustrated in FIG. 4.

Thus, operation flow 200 supports a faster unlock of the SED even though the KeyID is not known by the new host during the migration of the drive. The flow 200 illustrated in FIG. 4 also facilitates Dr. movement tracking by logging the server unique ID from where each drive is moved. by storing the WWN and the unique ID to the key management server 101, any key-related confidential information is stored in the drives. This moves the "key to drive" mapping information to KMS server 101, thereby enhancing overall security.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing encryption keys, the method comprising:
responsive to receiving, from a first client, a request to create a new key for encrypting a storage drive associated with the first client:
retrieving an identifier of the first client and an identifier of the storage drive;
generating and storing the new key and a corresponding key identifier (KeyID); and
associating the identifier of the storage drive and the identifier of the first client with the new key; and
responsive to receiving, from a second client, a locate key request, wherein the locate key request is indicative of the identifier of the storage drive, providing, to the second client, information indicative of the new key, the KeyID, and the identifier of the first client, wherein the first client comprises a first key management interoperability protocol (KMIP) client executing on a baseboard management controller (BMC) of a first managed server and the second client comprises a second KMIP client executing on a BMC of a second managed server.

2. The method of claim 1, further comprising: determining that the storage drive comprises a self-encrypting drive (SED).

3. The method of claim 1, further comprising: determining that the SED comprises an SED configured not to store KeyIDs internally.

4. The method of claim 1, wherein associating the identifier of the storage drive and the identifier of the first client with the new key comprises adding the identifier of the storage drive and the identifier of the first client as attributes of the KeyID.

5. The method of claim 1, further comprising: determining that the first client and the second client communicate with the same key management server.

6. The method of claim 1, further comprising: caching, by the second client, the new key, the KeyID, and the identifier of the first client.

7. A key management server for managing encryption keys, wherein the key management server is configured to perform key management operations comprising:
responsive to receiving, from a first client, a request to create a new key for encrypting a storage drive associated with the first client:
retrieving an identifier of the first client and an identifier of the storage drive;
generating and storing the new key and a corresponding key identifier (KeyID); and
associating the identifier of the storage drive and the identifier of the first client with the new key; and
responsive to receiving, from a second client, a locate key request, wherein the locate key request is indicative of the identifier of the storage drive, providing, to the second client, information indicative of the new key, the KeyID, and the identifier of the first client, wherein the first client comprises a first key management interoperability protocol (KMIP) client executing on a baseboard management controller (BMC) of a first managed server and the second client comprises a second KMIP client executing on a BMC of a second managed server.

8. The key management server of claim 7, further comprising: determining that the storage drive comprises a self-encrypting drive (SED).

9. The key management server of claim 7, further comprising: determining that the SED comprises an SED configured not to store KeyIDs internally.

10. The key management server of claim 7, wherein associating the identifier of the storage drive and the identifier of the first client with the new key comprises adding the identifier of the storage drive and the identifier of the first client as attributes of the KeyID.

11. The key management server of claim 7, further comprising: determining that the first client and the second client communicate with the same key management server.

12. The key management server of claim 7, further comprising: caching, by the second client, the new key, the KeyID, and the identifier of the first client.

\* \* \* \* \*